No. 839,309. PATENTED DEC. 25, 1906.
H. R. NELSON.
WEEDING ATTACHMENT FOR CULTIVATORS.
APPLICATION FILED JAN. 8, 1906.

2 SHEETS—SHEET 1.

WITNESSES

INVENTOR
HENRY R. NELSON
BY
HIS ATTORNEYS

No. 839,309. PATENTED DEC. 25, 1906.
H. R. NELSON.
WEEDING ATTACHMENT FOR CULTIVATORS.
APPLICATION FILED JAN. 8, 1906.

2 SHEETS—SHEET 2.

WITNESSES
M. McInnis
C. Mannamara

INVENTOR
HENRY R. NELSON
BY
HIS ATTORNEYS

UNITED STATES PATENT OFFICE.

HENRY R. NELSON, OF WALNUT GROVE, MINNESOTA.

WEEDING ATTACHMENT FOR CULTIVATORS.

No. 839,309.

Specification of Letters Patent.

Patented Dec. 25, 1906.

Application filed January 8, 1906. Serial No. 295,020.

*To all whom it may concern:*

Be it known that I, HENRY R. NELSON, of Walnut Grove, Redwood county, Minnesota, have invented certain new and useful Improvements in Weeding Attachments for Cultivators, of which the following is a specification.

The object of my invention is to provide an attachment particularly adapted for use on corn-cultivators for breaking up the clods of earth and loosening the soil around the hills and destroying the weeds which grow in and between the hills and which if left undisturbed will choke the corn-plants.

A further object is to provide an attachment capable of adjustment to adapt it for the varying conditions of the soil.

My invention consists generally in various constructions and combinations, all as hereinafter described, and particularly pointed out in the claims.

Figure 1:
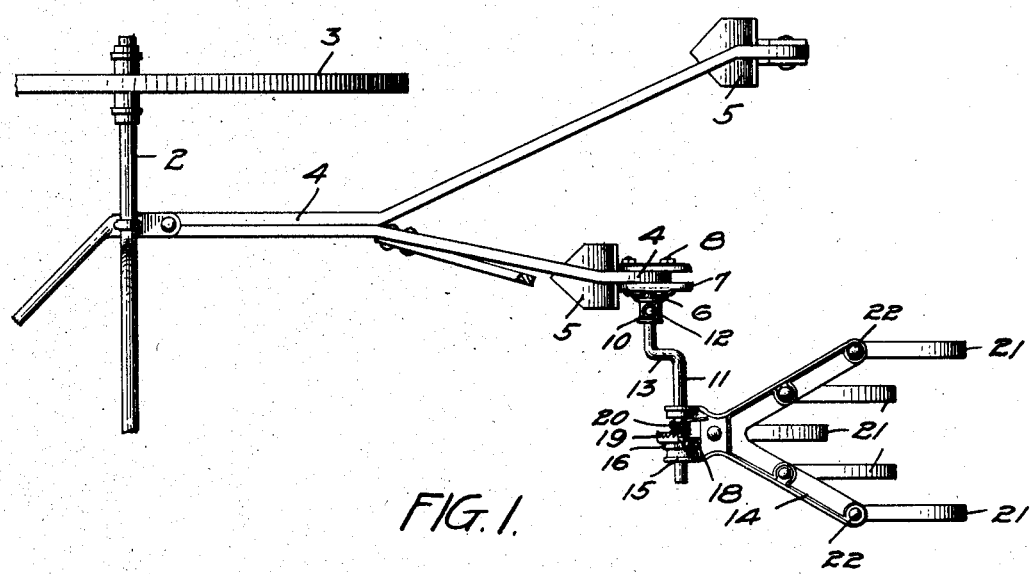
Figure 2:
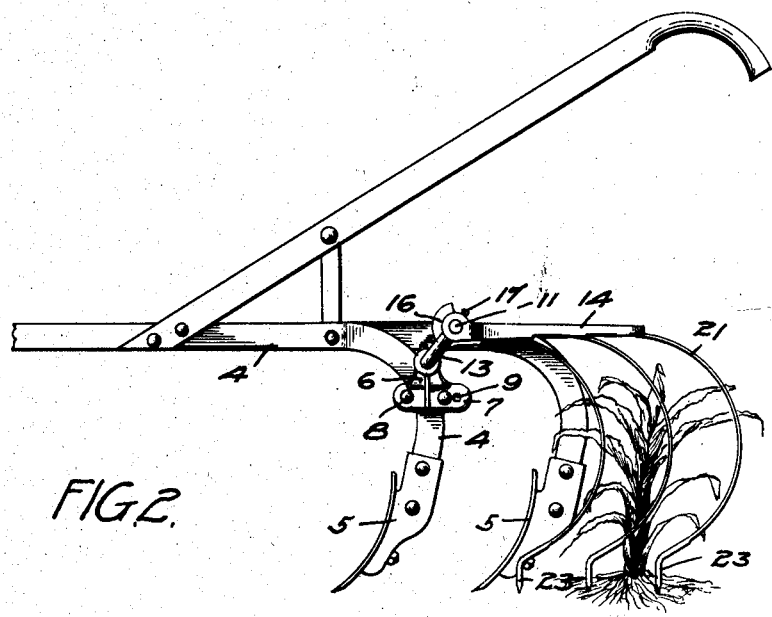
Figure 3:
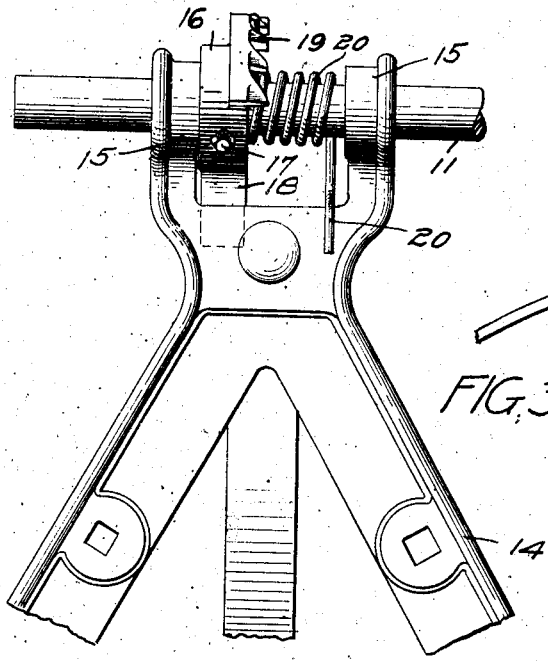
Figure 4:
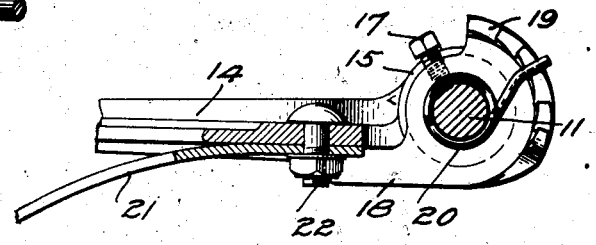
Figure 5:
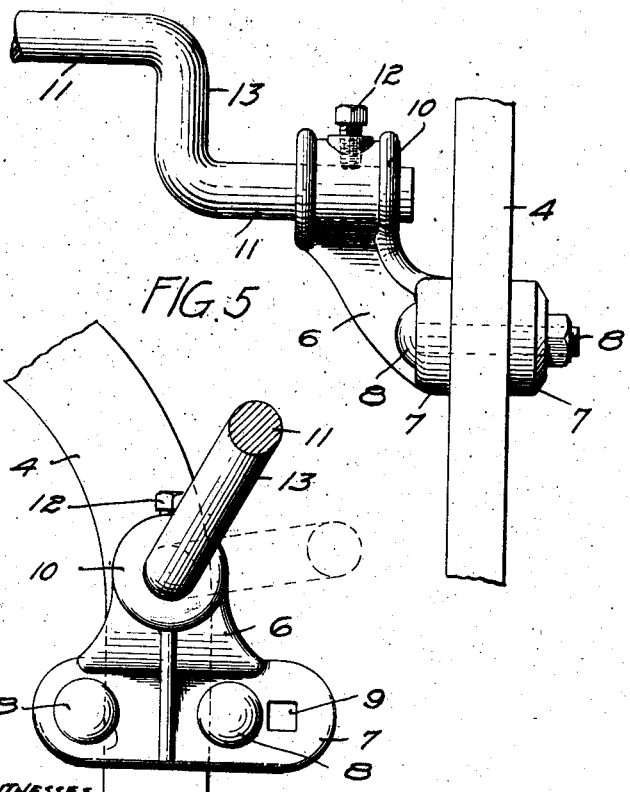
Figure 6:
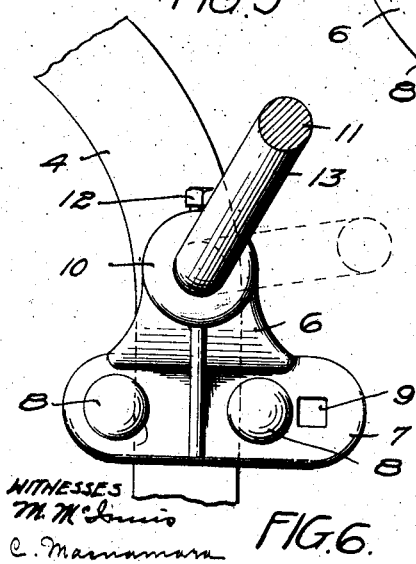

In the accompanying drawings, forming part of this specification, Figure 1 is a plan view of a portion of a cultivator, showing my attachment applied thereto. Fig. 2 is a side elevation of the same, showing the teeth of the attachment traveling over a hill of corn. Fig. 3 is a detail view illustrating the manner of supporting the attachment-frame on the cultivator. Fig. 4 is a sectional view of the same. Figs. 5 and 6 are details illustrating the manner of securing the attachment to the cultivator.

In the drawings, 2 represents the cultivator-axle, having a carrying-wheel 3 and drawbar 4, whereto the cultivator or plows 5 are attached. A bracket 6 is secured to one of the draw-bars by means of plates 7 and bolts 8, there being a series of holes 9 in the said plates to allow adjustment of the bolts to adapt the attachment for drag-bars of different width. The bracket 6 is upwardly turned and has a socket 10, wherein a rod 11 is secured by means of a set-screw 12. This rod is provided with an offset 13 and is capable of rotary and longitudinal adjustment in its bearing on the bracket 6 to permit adjustment of the teeth of the weeding attachment, as will hereinafter appear.

14 represents an A-shaped frame, having ears 15 loosely mounted on the rod 11 and permitting the frame to oscillate vertically thereon. A collar 16 is secured on the rod 11 by a set-screw 17 or other suitable means and has a lug 18, which projects in under the frame 14. A series of ratchet-teeth 19 are also provided on the said collar, and a spring 20 is coiled around the rod 11, preferably between the ears 15, and has one end in engagement with the teeth 19 and its other end bearing on the frame 14 on the opposite side thereof from the lug 18. The spring 20 is sufficiently loose on the rod 11 to allow one end to be moved back and forth in the teeth 19 for the purpose of regulating the tension of said spring and increasing or decreasing the pressure of its opposite end on the frame 14. This spring may be made of any suitable gage, and by its means the pressure of the teeth of the attachment in the soil can be easily controlled. Furthermore, as the spring exerts a yielding pressure on the frame carrying the teeth it follows that when the teeth strike an obstruction the frame will yield vertically and allow the teeth to pass over the obstruction, and thereby danger of breaking the teeth or the attachment is avoided. By loosening the set-screw 12 and rotating the rod 11 the height of the teeth from the ground can be regulated and the attachment adapted for a hard or loose soil.

I claim as my invention—

1. The combination with a cultivator drag-bar, of a bracket secured thereon and provided with a socket, a rod having an offset and fitting within said socket and having a rotary adjustment therein, a weeding device having a series of teeth mounted on said rod and a spring coiled about said rod and arranged to be put under tension by the vertical movement of said weeding device.

2. The combination with a cultivator, of a rod mounted thereon, an A-shaped frame loosely mounted on said rod and having a series of teeth, and a spring having a bearing at one end of said frame and adjustably held at its other end, substantially as described.

3. The combination with a cultivator, of a rod mounted thereon, an A-shaped frame loosely mounted on said rod, a collar secured on said rod and having a lug projecting under said frame and also having a series of ratchet-teeth, a spring coiled around said rod and having one end in adjustable engagement with said ratchet-teeth and the other end bearing on the top of said frame, and a series of weeding-teeth carried by said frame.

4. The combination, with a cultivator, of a rod mounted thereon and extending laterally therefrom, an A-shaped frame having a series of flexible teeth and a loose bearing on said rod which allows the free vertical movement of said frame and a spring device interposed between said frame and rod and engaging the former to hold its teeth in the soil with a yielding pressure, substantially as described.

5. The combination, with a cultivator, of a rod mounted thereon and projecting therefrom, an A-shaped frame having a series of teeth and ears having a hole to receive said rod and whereon said frame is arranged to oscillate vertically and a coiled spring arranged to bear on said frame at one end and having means at its other end whereby the tension of said spring may be regulated, substantially as described.

6. The combination, with a cultivator of a rod mounted thereon, a frame having a series of flexible teeth and a loose bearing on said rod which allows the free vertical movement of said frame, and a spring device arranged to hold the teeth of said frame in the soil with a yielding pressure, substantially as described.

In witness whereof I have hereunto set my hand this 2d day of January, 1906.

HENRY R. NELSON.

Witnesses:
 RICHARD PAUL,
 C. MACNAMARA.